United States Patent [19]
Berggren

[11] Patent Number: 5,963,863
[45] Date of Patent: Oct. 5, 1999

[54] ROUTING SYSTEM FOR AUTOMATICALLY ROUTING A CALL TO A MULTI-MODE TRANSCEIVER IN A WIRELESS NETWORK

[75] Inventor: Viktor Berggren, Sollentuna, Sweden

[73] Assignee: Telefonaktiebolaget L M Ericsson, Stockholm, Sweden

[21] Appl. No.: 08/565,922

[22] Filed: Dec. 1, 1995

[51] Int. Cl.⁶ .............................. H04Q 7/20; H04Q 7/38
[52] U.S. Cl. ............................................. 455/445; 455/403
[58] Field of Search .................................. 455/403, 445; 370/85.2; 375/39

[56] References Cited

U.S. PATENT DOCUMENTS

| | | |
|---|---|---|
| 4,313,035 | 1/1982 | Jordan et al. ............................ 179/18 |
| 4,742,560 | 5/1988 | Arai . |
| 4,833,701 | 5/1989 | Comroe et al. . |
| 4,843,622 | 6/1989 | Yotsutani et al. . |
| 5,008,879 | 4/1991 | Fischer et al. ......................... 370/85.2 |
| 5,050,189 | 9/1991 | Cox et al. ................................ 375/39 |
| 5,095,529 | 3/1992 | Comroe et al. . |
| 5,101,500 | 3/1992 | Marui . |
| 5,301,359 | 4/1994 | Van den Heuvel et al. . |
| 5,384,824 | 1/1995 | Alvesalo . |
| 5,432,841 | 7/1995 | Rimer ....................................... 379/59 |
| 5,437,053 | 7/1995 | Sawa et al. . |
| 5,448,619 | 9/1995 | Evans et al. . |
| 5,463,674 | 10/1995 | Gillig et al. . |

FOREIGN PATENT DOCUMENTS

| | | |
|---|---|---|
| 0 433 465 A1 | 6/1991 | European Pat. Off. . |
| 0 660 626 A2 | 6/1995 | European Pat. Off. . |
| 2 693 863 | 1/1994 | France . |
| 434335 A1 | 6/1995 | Germany . |
| 4-57592 | 2/1992 | Japan . |
| 2225512 | 5/1990 | United Kingdom . |
| 2282735 | 12/1995 | United Kingdom . |
| WO 91/09506 | 6/1991 | WIPO . |
| WO 93/18606 | 9/1993 | WIPO . |
| WO 95/01070 | 1/1995 | WIPO . |

*Primary Examiner*—William Cumming
*Attorney, Agent, or Firm*—Jenkens & Gilchrist, P.C.

[57] ABSTRACT

A routing system, and an associated method, for routing a call to a multi-mode transceiver. Selection of a service subscription pursuant to which calls are to be routed to the transceiver is made at the transceiver, and information related to the selected service subscription is transmitted to a service node and stored at the service node. When an originating party desires to place a call to the transceiver, the originating party accesses the information stored at the service node. Responsive to the information stored at the service node, the call is routed to the transceiver pursuant to the selected service subscription.

20 Claims, 8 Drawing Sheets

ROUTING SYSTEM FOR AUTOMATICALLY ROUTING A CALL TO A MULTI-MODE TRANSCEIVER IN A WIRELESS NETWORK

TECHNICAL FIELD OF THE INVENTION

The present invention relates generally to a wireless communication system having a multi-mode transceiver operable pursuant to at least two separate service subscriptions. More particularly, the present invention relates to a system and method for automatically selecting one service subscription amongst the separate service subscriptions pursuant to which an incoming call directed to the transceiver is to be routed and for routing calls to the transceiver pursuant to the selected service subscription.

When the transceiver is being operated in an area in which service pursuant to only one service subscription is available, the incoming call is directed to the transceiver pursuant to the available service subscription. When the transceiver is being operated in an area in which more than one service subscription is available, a selection is made at the transceiver of a preferred service subscription pursuant to which incoming calls are to be routed. Once selection of the service subscription has been made and registered, calls to be terminated at the transceiver are routed to the transceiver pursuant to the selected service subscription.

BACKGROUND OF THE INVENTION

Utilization of wireless communication systems to communicate telephonically has achieved wide popularity in recent years. Because a wireline connection is not required to effectuate telephonic communication, communication by way of a wireless communication system is possible at a location to which formation of a wireline connection would be impractical or impossible.

Cellular communication networks, for instance, have been installed throughout significant portions of the world. Large numbers of subscribers to such cellular networks are able to communicate telephonically when positioned in areas encompassed by such cellular networks. Telephonic communication of both voice and data are permitted in such networks.

A subscriber to a cellular communication network subscribes to a service subscription. The subscriber is permitted to communicate telephonically by way of the cellular communication network pursuant to the service subscription. The service subscription provides, e.g., an identification number which is used to identify the subscriber, both to permit utilization of the cellular communication network and also to bill the subscriber for such utilization. Calls placed by, and sometimes placed to, the subscriber are billed to a service subscription account associated with the service subscription.

Technological advancements in communication technologies have permitted wireless communication not only in such existing networks to become increasingly affordable, but have also facilitated the advent of additional types of wireless communication systems. Such additional types of wireless communication systems also permit wireless, telephonic communication.

Various cordless telephone networks are examples of additional wireless communication systems. Standards defining the operation and technical features of such networks have been promulgated. Standards for the CT-1, CT-2, CT-3, and Digital Electronic Cordless Telephone (DECT) systems are all examples of standards which have been promulgated for cordless telephone networks.

Such additional networks, as well as others, are generally supplementary to existing wireless, communication networks. For instance, the aforementioned standards promulgated for cordless telephone networks pertain primarily to localized communication networks, generally operable over a relatively small geographic area. In contrast, conventional cellular networks typically encompass larger geographic areas.

A significant cost associated with conventional, cellular networks pertain to "hand-off" procedures. By "handing-off" an ongoing call between base stations of a cellular communication network, continued communication is permitted with a party using the transceiver as the transceiver is moved to different locations throughout the area encompassed by the cellular system. As a transceiver is moved throughout the geographic area encompassed by the cellular network, continuous communication by way of the transceiver is permitted by "handing-off" the call from one base station to another.

A cordless telephone network, in contrast, is generally constructed merely to provide localized wireless communications. Therefore, circuitry required to perform the hand-off procedures is not required. As a result, the costs associated with the communication in the cordless telephone networks is typically, or is anticipated to be, less than costs associated with communication in a conventional, cellular network.

Because of the lower costs, one desiring to communicate telephonically in a wireless communication system might prefer to communicate by way of a cordless telephone network, when available. When communication by way of a cordless telephone network is unavailable, communication by way of a cellular, communication network can instead be selected.

To avoid requiring a subscriber to both types of networks to carry two separate transceivers, one operable, pursuant to a service subscription in one communication network and another operable pursuant to a service subscription in a separate communication network, dual mode transceivers have been developed permitting communication in either of the communication networks.

Communication in a single network pursuant to two, or more, separate service subscriptions is sometimes also desired. Transceivers permitting communication pursuant to a selected one of the service subscriptions have also been developed.

More generally, transceivers permitting communication in a selected network pursuant to a selected service subscription have been developed. Such transceivers shall be referred to herein as multi-mode transceivers.

Communication pursuant to a selected service subscription can be effectuated by way of single transceiver. The service subscriptions may provide service in more than two wireless communication networks, or provide for separate service subscriptions in a single wireless communication network. For instance, a user may subscribe to two separate service subscriptions in a single network so that certain calls can be billed to a billing account of one service subscription, and other calls can be billed to a billing account of a separate service subscription.

When a call is initiated by a subscriber to the plurality of service subscriptions at a dual- or multi-mode transceiver, the subscriber is able to make a selection as to which of the service subscriptions pursuant to which an outgoing call is to be placed. Selection of the service subscription by the operator of the transceiver can be made manually or can be made automatically responsive to operation of circuitry of the transceiver. The service subscription pursuant to which the call is to be made can be selected, e.g., based upon the availability of service by a particular communication network or a preferred service subscription if communication pursuant to more than one service subscription is available.

However, a caller placing a call to the dual- or multi-mode transceiver is not necessarily aware of the availability of service pursuant to a particular service subscription. The transceiver to which the call is placed might be positioned at a location at which service pursuant to one of the service subscriptions is not available. If a call is placed to the transceiver pursuant to the unavailable service subscription, the call can not be successfully terminated at the transceiver. Analogously, a call might be placed by the caller to the dual- or multi-mode transceiver pursuant to a non-preferred service subscription when the caller is without knowledge of the availability of service pursuant to a preferred service subscription.

Various types of registration procedures are sometimes used to facilitate communication pursuant to a selected service subscription. Such existing registration procedures, however, generally require manual registration of the selected service subscription pursuant to which communication is desired. Due to the requirement of a manual registration procedure, such existing registration procedures are cumbersome. The success of a registration procedure is dependent upon affirmative actions taken to manually register the selection.

A manner by which an incoming call to a dual- or multi-mode transceiver could be automatically routed to the transceiver pursuant to a desired service subscription would therefore be advantageous.

It is in light of this background information related to multi-mode transceivers utilized in a wireless communication system that the significant improvements of the present invention have evolved.

SUMMARY OF THE INVENTION

The present invention advantageously provides for the automatic registration of a selected service subscription pursuant to which calls directed to a dual- or multi-mode transceiver are to be routed. When a caller places a call to be directed to the transceiver, the caller need not be aware of which service subscription pursuant to which calls directed to the transceiver are to be routed. The call is automatically routed to the transceiver pursuant to a service subscription selected at the transceiver. If service pursuant to only one service subscription is available, the call is routed to the transceiver pursuant to the available service subscription. If communication is available pursuant to more than one service subscription, a determination is made at the transceiver as to a preferred service subscription pursuant to which the call is to be routed.

In an exemplary embodiment, the transceiver is operable in a cellular, communication network and also in a cordless telephone network. When a call is placed at the transceiver, selection is made, either automatically or manually, as to which of the service subscriptions pursuant to which the outgoing call is to be routed.

When an incoming call is placed to be terminated at the transceiver, the call is routed to the transceiver pursuant to one of the service subscriptions. Selection as to which of the service subscriptions pursuant to which the call is to be routed is made at the transceiver. Once the selection is made, the selection is registered at a call router. When the caller places the incoming call to the transceiver, the call is routed to the call router and the call router, in turn, routes the call to the transceiver pursuant to the selected service subscription. The caller need know only a single dialing code to access the call router. The caller need not be knowledgeable of the dialing codes associated with each of the service subscriptions pursuant to which calls might be permitted to be routed to the transceiver.

In one embodiment, when the caller places the call, signalling channels are used to access the call router. Once the data stored at the call router is accessed and a service subscription pursuant to which the call is to be routed is ascertained, voice channels are utilized to terminate the call. In an embodiment in which the call router is formed of distributed portions and a centrally-located database, the call is first routed to, e.g., a most-proximate distributed portion of the call router via a signalling channel. Thereafter, an interrogation is made of the centrally-located database. Then, the call is routed to the transceiver in conventional fashion. Selection can be made, for example, to have calls routed pursuant to the subscription for service in the cordless telephone network when communication therethrough is available, and communication pursuant to the subscription for service by way of the cellular communication network when communication by way of the cordless telephone network is unavailable. In such manner, communication costs can be minimized as communication in a cordless telephone network is typically less costly than communication by way of a cellular communication network.

In one aspect of the present invention, therefore, a routing system for routing an incoming call directed to a multi-mode transceiver pursuant to a selected service subscription is disclosed. The transceiver is operable in a wireless communication system, and the transceiver is operable pursuant to at least two separate service subscriptions to receive service in at least one wireless communication network. The routing system routes the incoming call pursuant to a selected service subscription of the at least two separate service subscriptions. A service selector is positioned together with the multi-mode transceiver. The service selector selects the selected service subscription by which the incoming call directed to the multi-mode transceiver is to be routed. A call router is coupled to the at least one wireless communication network. The call router receives the incoming call and routes the incoming call pursuant to the selected service subscription. A selected service transmitter is coupled to the service selector to receive indications of the selected service subscription selected by the service selector. The selected-service transmitter transmits the indications of the selected service subscription to the call router.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
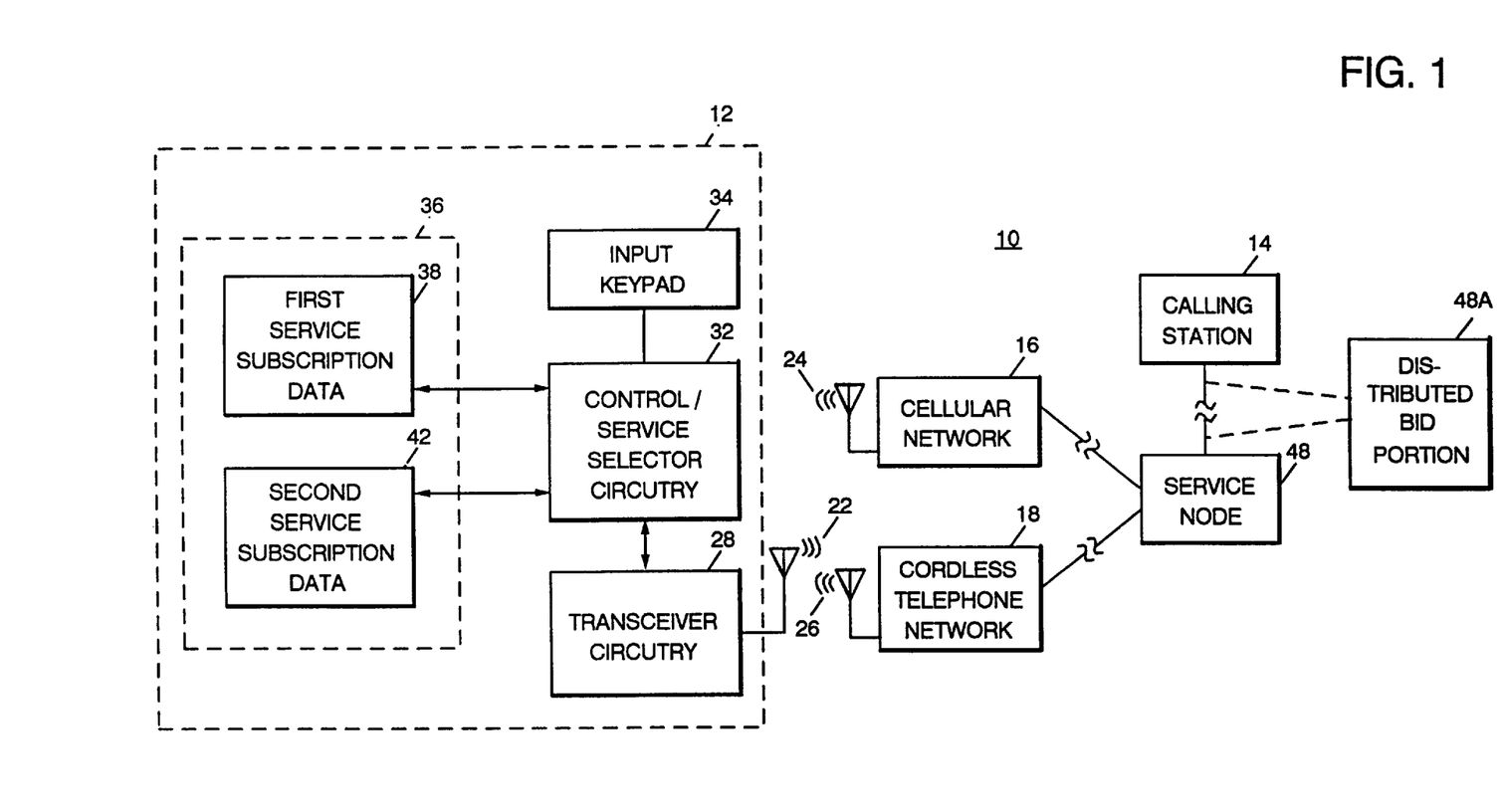
FIG. 1 is a functional block diagram of a communication system having a multi-mode transceiver operable to communicate pursuant to a multiple number of service subscriptions.

FIG. 1 illustrates a communication system, shown generally at 10, of which an embodiment of the present invention forms a portion. The system 10 includes a multi-mode transceiver 12, here a dual mode transceiver. The dual mode transceiver is operable pursuant to at least two separate service subscriptions.

In the illustrated embodiment, the transceiver 12 is operative pursuant to a first service subscription to communicate with a calling station by way of a cellular network 16 or, alternately by way of a second service subscription to communicate with the calling station 14 by way of a cordless telephone network 18. In conventional fashion, the cellular network is formed of a plurality of base stations, a base station controller, mobile switching center, etc. connected together to form a working network. Analogously, the cordless telephone network is formed in conventional fashion and includes a fixed port permitting of two-way communication with a remotely-positioned transceiver. When operative to communicate by way of the cellular network 16, the transceiver 12 transmits radio frequency signals 22 to, and receives radio frequency signals 24 generated at, a base station of the cellular network 16 in conventional manner. Analogously, when the transceiver 12 is operative to communicate by way of the cordless telephone network 18, the transceiver 12 transmits radio frequency signals 22 to, and receives radio frequency signals generated at, a port of the cordless telephone network, in conventional manner.

The multi-mode transceiver 12 is shown to include transceiver circuitry 28 for performing transceiving operations, both to generate radio frequency signals and to receive radio frequency signals. Communication with the calling station 14 is thereby permitted, alternately by way of the cellular network 16 and by way of the cordless telephone network 18.

Control/service selector circuitry 32 is coupled to the transceiver circuitry 28 and controls operation of the transceiver circuitry 28. Control operations performed by the circuitry 32 select the signal characteristics of the signals generated by the transceiver circuitry 28. When the transceiver is to be operable to communicate in the cellular network 16, the signal characteristics are selected pursuant to the requirements of the cellular network. When the transceiver is operable to communicate in the cordless telephone network 18, the signal characteristics are selected pursuant to the requirements of the cordless network. The control operations performed by the circuitry 32 further causes the selection of channels to which the transceiver circuitry 28 is tuned to receive signals transmitted to the transceiver 12 by way of either the cellular network 16 or the cordless telephone network 18.

The circuitry 32 is coupled to receive inputs entered by a user of the transceiver by way of an input keypad 34. Actuation by the user of selected keys of the input keypad 34 are interpreted during operation of the circuitry 32. The circuitry 32 is further coupled to a memory device 36. In the illustrated embodiment, the memory device includes a first set of memory locations for storing data related to a first service subscription, indicated in the figure by the block 38. The memory device 36 includes a second set of memory locations for storing data associated with a second service subscription, represented in the figure by the block 42.

During operation of an embodiment of the present invention, data related either to the first service subscription or to the second service subscription is retrieved from the memory device 36 and modulated and transmitted by the transceiver circuitry 28. The data is transmitted by way of either the cellular network 16 or the cordless telephone network 18, thereafter to be stored in a service node 48. As shall be noted in greater detail below, the service node 48 can be positioned at any of various locations and can be formed either of a physical device, such as a switch, or of a logical device, such as a software-implemented element. The service node 48, wherever positioned and howsoever formed, is identified by a unique identification address. Entry of the unique address at, for example, the calling station 14, provides for access to the service node 48. A distributed portion 48A of the service node 48 is further illustrated in the figure. The distributed portion 48A is illustrated to indicate that, in one embodiment of the present invention, the service node is formed of distributed portions, such as the portion 48A coupled to a centrally-located database portion.

The data stored in the memory device 36 includes routing information related to a calling identification number (i.e., telephone number) of each of the service subscriptions. Transmission of such data associated with a selected one of the service subscriptions is stored in the service node 48. Selection of data which is to be transmitted for storage in the service node 48 is made either automatically or responsive to entry by a user of the transceiver 12, such as by way of the input keypad 34, or for example orally by way of a microphone (not shown).

When the transceiver 12 is positioned at a location at which communication is permitted with only one of the networks 16 or 18, the data related to a service subscription pursuant to the available network is retrieved from the memory device 36 and transmitted by the transceiver circuitry 28 to be stored in the service node 48. In one embodiment, the availability of service is determined at timed intervals. When an other-than-preferred service subscription is the only available service subscription pursuant to which service is available, such service subscription is utilized for communication until the preferred service subscription is determined to be available at a subsequent time.

When communication pursuant to more than one service subscription, here when the transceiver 12 is positioned at a location permitting communication by way of either the cellular network 16 or the cordless telephone network 18, one of the service subscriptions forms a preferred a service subscription. Data related to the preferred service subscription is retrieved from the memory device 36 and transmitted by the transceiver circuitry 28 to be stored at the service node 48.

As mentioned previously, for cost reasons, it might be preferable to communicate by way of a cordless telephone network when communication therethrough is available rather than to communicate by way of a cellular network. Accordingly, in one embodiment, data related to a service subscription permitting communication by way of a cordless telephone network forms a preferred service subscription. When communication by way of the cordless telephone network 18 is available, data related to the service subscription permitting communication by way of the cordless telephone network 18 is retrieved from the memory device 36, transmitted by the transceiver circuitry 28, and stored in the service node 48. In one embodiment, the data is transmitted as a dual tone multifrequency signal formed of sequences of tones. When communication by way of the cordless telephone network 18 is unavailable, data related to a service subscription permitting communication by way of the cellular network 16 is retrieved from the memory device 36, transmitted by the transceiver circuitry 28, and stored in the service node 48.

When a caller (i.e., an "originating" party) places a call at the calling station 14 to a receiving party (i.e., the terminating party) positioned to receive the call at the transceiver 12, the originating party enters digits, the service node identification, at the calling station 14 to access the service node 48. The originating party need not be aware of which service subscription is used to route the call to the transceiver 12. The service subscription pursuant to which the call is to be routed to the transceiver is stored at the service node 48, and the call is automatically routed pursuant thereto. In one embodiment, when the caller places the call, signalling channels are used to access the call router. Once the data stored at the call router is accessed and a service subscription pursuant to which the call is to be routed is ascertained, voice channels are utilized to terminate the call. In an embodiment in which the call router is formed of distributed portions and a centrally-located database, the call is first routed to, e.g., a most-proximate distributed portion fo the call router via a signalling channel. Thereafter, an interrogation is made of the centrally-located database. Then, the call is routed to the transceiver in conventional fashion.

Because the originating party accesses the service node, and the call is routed to the transceiver 12 pursuant to the service subscription selected at the transceiver 12, the call can be routed to the transceiver 12 as long as service pursuant to one of the service subscriptions is available. If, instead, the originating party directly enters the calling identification of one of the service subscriptions and service pursuant to such service subscription is unavailable, the call would otherwise not be successfully terminated at the transceiver 12. And, if service is available pursuant to such service subscription, the call may, in any event, not be routed to the transceiver 12 pursuant to a preferred service subscription.

While the foregoing description describes an embodiment of the present invention in which the first service subscription permits communication by way of a cellular network and the second service subscription permits communication by way of a cordless telephone network, in other embodiments, other combinations are possible.

For instance, communication by way of a single network, such as the cellular network 16 pursuant to two or more service subscriptions can be purchased. And, data related to more than two service subscriptions can be stored at the transceiver 12. For instance, a residential service subscription and a business service subscription can be purchased to permit communication by way of the cellular network 16. One of the service subscriptions is defined to be a preferred service subscription, such as by manual entry of one of the service subscriptions as the preferred service subscription by way of the input keypad 34. Data related to the selected service subscription is retrieved from the memory device 36, transmitted by the transceiver circuitry 28, and stored at the service node 48, in manners analogous to those described above. Other arrangements are similarly possible.

In one embodiment of the present invention, selection of a service subscription to form the selected service subscription is made by the control/service selector circuitry 32. The circuitry 32 determines the availability of communication by way of the cellular and cordless telephone networks 16 and 18, respectively. Such determination can be made in conventional manner.

If communication by way of only the cellular network 16 is available, the service subscription permitting communication by way of the cellular network is selected by the circuitry 32 to form the selected service subscription. If communication by way of both networks 16 and 18 is available, a preferred one of the service subscriptions is selected to form the selected service subscription. In the event that communication is available only by way of the cordless telephone network, the service subscription permitting communication by way of the cordless telephone network is selected to form the selected service subscription.

Once selection of the selected service subscription is made, the data related to the selected service subscription is transmitted to, and stored at, the service node 48. A call thereafter placed by an originating party at the calling station 14 to be terminated at the transceiver is routed to the transceiver 12 pursuant to the selected service subscription by accessing the data stored at the service node 48.

Figure 2:
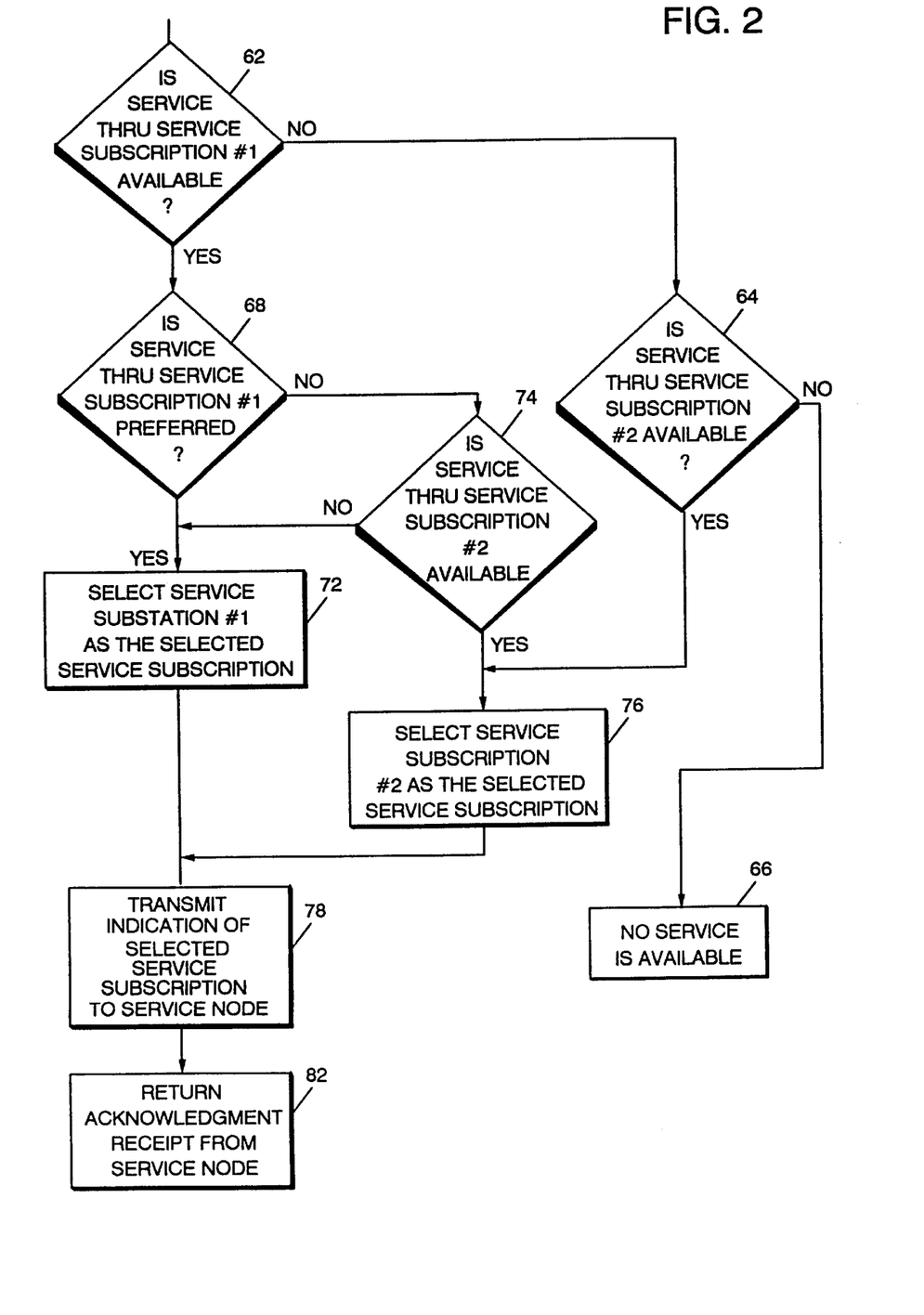
FIG. 2 is a logical flow diagram listing the method steps of operation of a portion of an embodiment of the present invention.

FIG. 2 illustrates a method, shown generally at 58, of an embodiment of the present invention. The method 58 is performed, e.g., by the control/service selector circuitry 32 which forms a portion of the transceiver 12 shown in FIG. 1. The circuitry includes, for instance, a processing device having algorithms executable by the processing device to perform the decisional and logical steps of the method.

With reference, therefore, to the method 58, a determination is first made, as indicated by the decision block 62, as to whether service by way of a first service subscription is available. If service is unavailable pursuant to the first service subscription, the no branch is taken to decision block 64. A determination at decision block 64 as to whether service is available pursuant to the second service subscription. If service is also unavailable pursuant to the second service subscription, the no branch is taken from the decision block 64 to block 66 as service is not available pursuant to either of the service subscriptions.

If, conversely, service is available pursuant to the first service subscription, the yes branch is taken from decision block 62 to decision block 68. A determination is made at the decision block 68 as to whether service pursuant to the first service subscription is the preferred service subscription in the event that service pursuant to more than one service subscription is available. If service pursuant to the first service subscription is the preferred service subscription, the yes branch is taken from the decision block 68 and service pursuant to the first service subscription is selected to form the selected service subscription, as indicated by the block 72.

If, at the decision block 68, a determination is made that service pursuant to the first service subscription is not the preferred service subscription, the no branch is taken from the decision block 68 to decision block 74.

At decision block 74, a determination is made as to whether service pursuant to the second service subscription is available. If so, the yes branch is taken, and the second service subscription is selected to be the selected service subscription, as indicated by the block 76. If, conversely, a determination is made at the decision block 74, that service pursuant to the second service subscription is unavailable, the no branch is taken back to the block 72 and the first service subscription is selected to form the selected service subscription.

Once the first service subscription is selected to form the selected service subscription at the block 72 or the second service subscription is selected to form the selected service subscription at the block 76, an indication of the selected service subscription is transmitted, as indicated by the block 78, to the service node, such as the service node 48 shown in FIG. 1. Thereafter, and as indicated by the block 82, the service node returns an acknowledgment of receipt of the transmitted indication.

Figure 3:
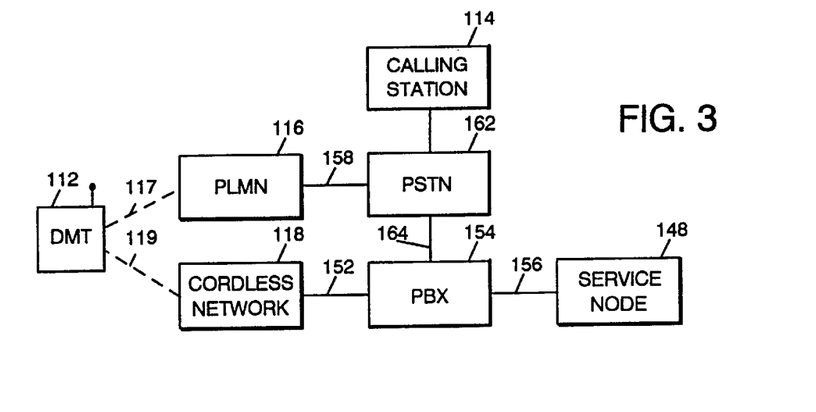
FIG. 3 is a functional block diagram illustrating a communication system in which an embodiment of the present invention forms a portion.

FIG. 3 illustrates a communication system, shown generally at 100, of which an embodiment of the present invention forms a portion. Analogous to the communication system 10 shown in FIG. 1, the communication system 100 permits communication between a dual mode transceiver (DMT) 112 and a calling station 114.

When an originating party places a call which is to be terminated at the transceiver 112, operation of an embodiment of the present invention ensures that the call is routed to the transceiver pursuant to a selected service subscription. The service subscription pursuant to which the call is routed to the transceiver is selected at the transceiver 112, and indications of the service subscription selected at the transceiver 112 are transmitted to a service node 148.

The communication system 100 shown in FIG. 3 includes a public land mobile network (PLMN) 116 of which the dual mode telephone 112 forms a portion. For purposes of illustration, the telephone 112 is separately pictured, coupled to the PLMN 116 by way of a radio channel 117. The system 100 further includes a cordless telephone network 118 of which the telephone 112 forms a portion. Again, for purposes of illustration, the telephone is separately pictured, coupled to the network 118 by way of a radio channel 119.

When, for instance, communication pursuant to the cordless telephone network is available, indications of the selected service subscription pursuant to which an incoming call is to be routed to the transceiver 112 are transmitted from the transceiver 112 to a fixed port of the cordless telephone network 118 pursuant to a registration request. In the embodiment illustrated in the figure, the cordless telephone network 118 is coupled by way of line 152 to a private branch exchange (PBX) 154. Line 156 couples the PBX 154 with the service node 148. The indications of the selected service subscription transmitted by the transceiver 112 to the fixed port of the network 118 are, in turn, routed by line 152 to the PBX 154 and, by the line 156, to the service node 148. The indications of the selected service subscription can thereby be stored at the service node 148.

Analogously, when communication by way of the public land mobile network is available, indications of the service subscription pursuant to which calls are to be routed to the dual mode transceiver 112 can be transmitted from the transceiver 112 to the base station of the PLMN 116 pursuant to a registration request. In the embodiment illustrated in FIG. 3, the base station of the PLMN 116 is coupled by way of line 158 to a public service telephonic network (PSTN) 162. The PSTN 162 is coupled by way of line 164 to the PBX 154. The indications of the selected service subscription transmitted to the base station 116 can be routed by way of the line 158 to the PSTN 162, by way of the line 164 to the PBX 154, and by way of the line 156 to be stored at the service node 148.

Once the indications of the selected service subscription are stored at the service node 148, an originating party located at the calling station 114 desiring to place a call to the transceiver 112 accesses the service node 148 by entering, at the calling station, a unique address of the service node 148. The service subscription pursuant to which the call is to be routed to the transceiver 112 is determined, and the call to the transceiver 112 is routed accordingly.

In one embodiment, a first unique address to identify the service node 148 is used by the transceiver 112 and a second unique address to identify the service node 148 is used at the calling station 114. The service node 148, although identifiable by two separate unique addresses, is able to determine the reason for which the node is being accessed due to a determination of which unique address is being used to identify the node.

Figure 4:
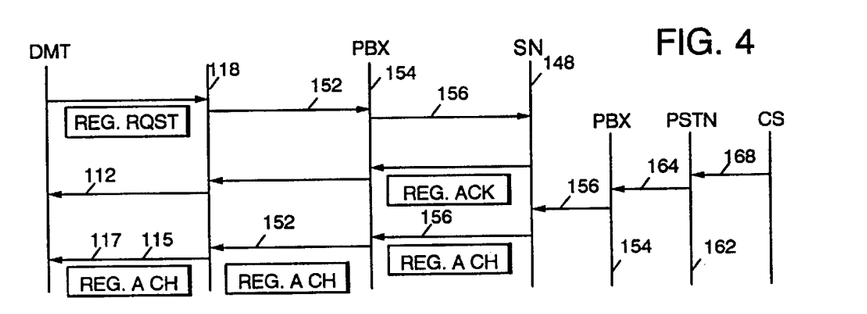
FIG. 4 is a graphical representation illustrating one manner by which signals can be routed between the multi-mode transceiver and the calling station of the communication system shown in FIG. 3.

FIG. 4 illustrates the routing of signal transmission by way of a cordless telephone network to store the indications of the selected service subscription in the service node 148, and the routing of a call placed by an originating party at the calling station 114 to the transceiver 112 by way of the cordless telephone system.

The dual mode transceiver 112 selects which of the service subscriptions is to be the selected service subscription pursuant to which an incoming call is to be routed to the transceiver. Indications of the selected service subscription are transmitted as part of a registration request by way of the radio channel 119 to the fixed port of the cordless telephone network 118. Indications of the service node identification of the service node 148 and the terminal identification of the DMT 112 are, e.g., also preferably transmitted to the fixed port 118. Such indications are transmitted thereafter by way of line 152 to the PBX 154 and, by way of line 156, to be stored at the service node 148. Once the registration request is received and stored at the service node, the service node returns a registration acknowledgment to the DMT 112. The registration acknowledgment is returned, for example, by way of the same paths, in reverse order, as those paths taken by the registration request.

When an originating party at the calling station 114 places a call to the transceiver 112, the originating party enters the service node identification at the calling station. The call request is transmitted by way of the line 168 to the PSTN 162. Thereafter, the call request is transmitted on the line 164 to the PBX 154 and, then, by way of the line 156 to the service node 148. When the selected service subscription stored at the service node 148 is the cordless telephone network, the call is thereafter routed on line 156 to the PBX 154, on the line 152 to the network 118, and upon the radio channel 119 to be terminated at the DMT 112.

Figure 5:
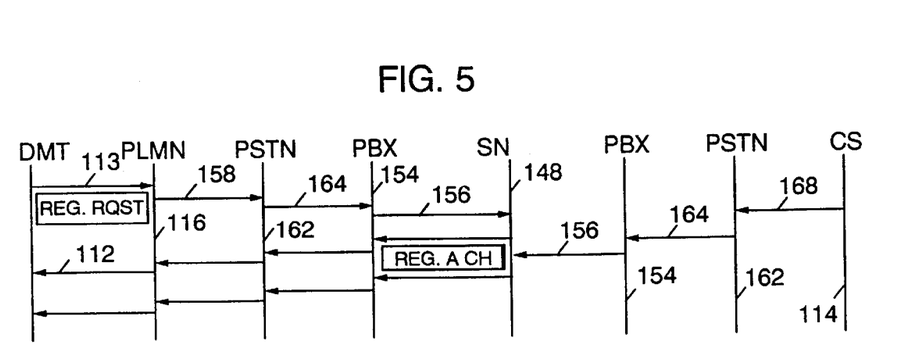
FIG. 5 is a graphical representation, similar to that shown in FIG. 4, but which illustrates another manner by which signals can be routed between a multi-mode transceiver and the calling station coupled of the communication system shown in FIG. 3.

FIG. 5 illustrates the routing of signal transmission by way of a PLMN to store the indications of the selected service subscription in the service node 148, and the routing of a call placed by an originating party at the calling station 114 to the transceiver 112 by way of the PLMN.

When communication pursuant to the PLMN 116 is available, indications of the service subscription selected at the transceiver 112 can be transmitted by way of a registration request to the base station of the PLMN 116 by way of the radio channel 117. The registration request is thereafter transmitted upon the line 158 to the PSTN 162. Then, the request is transmitted upon the line 164 to the PBX 154, and upon the line 156 to the service node 148. Once the registration request is received and stored at the service node, the service node returns a registration acknowledgment to the DMT 112. The registration acknowledgment is returned by way of the same paths, in reverse order, as those taken by the registration request.

When an originating party at the calling station 114 desires to place a call to the DMT 112, the originating party enters the unique identification of the service node at the calling station 114. The call request is transmitted by way of the line 168 to the PSTN 162, then, by the line 164 to the PBX 154, and thereafter by way of the line 156 to the service node 148. If the selected service subscription stored at the service node 148 is a service subscription for service by way of the PLMN, the call is routed on line 156 to the PBX 154, by way of the line 164 to the PSTN 162, by way of the line 158 to the base station of the PLMN 116, and by way of the radio channel 117 to the transceiver 112.

FIGS. 4 and 5 illustrate the routing of a call to the dual mode transceiver 112 by way of the same network pursuant to which the indications of the selected service subscription are transmitted to be stored at the service node 148. However, it should be noted that such illustrations are exemplary only. The registration requests can instead be transmitted by way of a one of the networks and the call originated by the originating party at the calling station 114 can be routed by way of the other network. With respect to FIGS. 4 and 5, therefore, portions of each of the figures can be combined in other manners to show the routing of the registration requests (and acknowledgments) pursuant to one network and routing of the calls pursuant to the other network.

Figures 6, 7:
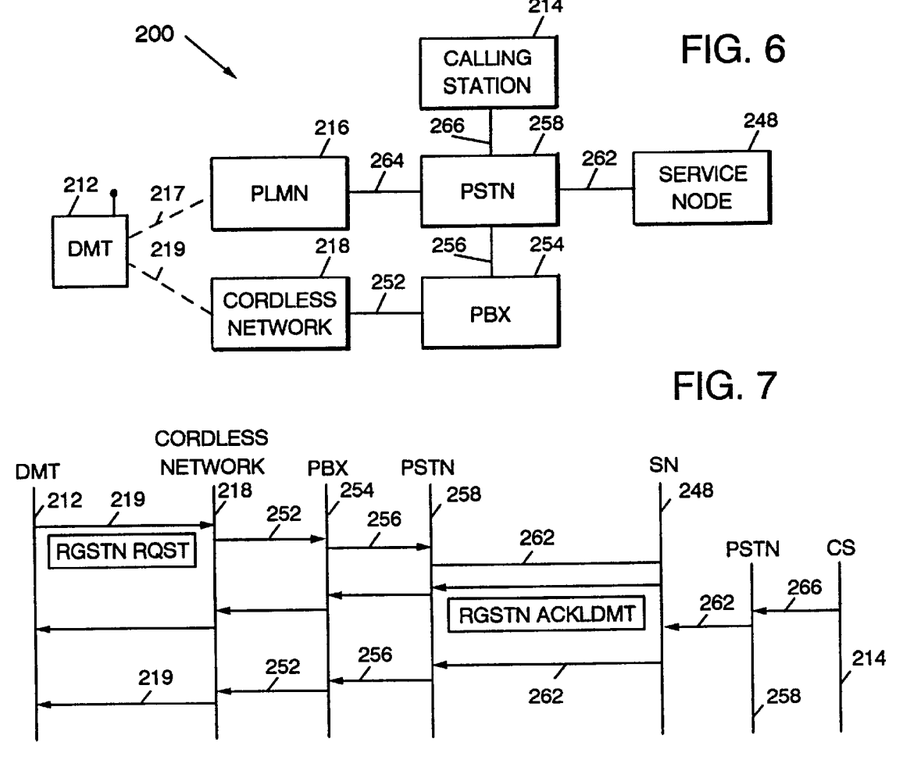
FIG. 6 is a functional block diagram, similar to that shown in FIG. 3, but which illustrates a communication system of another configuration in which an embodiment of the present invention forms a portion.
FIG. 7 is a graphical representation illustrating one manner by which signals can be routed between the multi-mode transceiver and the calling station of the communication system shown in FIG. 6.

FIG. 6 illustrates a communication system, shown generally at 200, of another embodiment of the present invention. Again, a dual mode transceiver, here transceiver 212, can terminate a call placed by an originating party at a calling station 214. The communication system includes a public land mobile network (PLMN) 216. Again, the transceiver 212 forms a portion of the PLMN but is separately shown in the figure, coupled by way of a radio channel 217 to the PLMN. The system 200 also includes a cordless telephone network 218 of which the separately-illustrated transceiver 212 forms a portion, coupled thereto by way of a radio channel 219. The transceiver 212 selects a service subscription pursuant to which calls are to be routed to the transceiver, as above-described with respect to the previous figures.

When, for instance, communication by way of the cordless telephone network is available, indications of the service subscription selected at the transceiver 212 are transmitted by way of a radio frequency channel as part of a registration request to a fixed port of the cordless telephone network 218. The registration request also includes, for example, the service node identification and the terminal identification. Thereafter, the registration request is transmitted upon the line 252 to the private branch exchange (PBX) 254. The PBX 254 is coupled by way of line 256 to a public service telephone network (PSTN) 258. The PSTN 258 is coupled by way of line 262 to the service node 248. The indications of the selected service subscription can thereby be stored at the service node 248 when the registration request is received thereat.

In a similar manner, when communication by way of the PLMN is available, the indications of the selected service subscription can be transmitted upon the radio frequency channel 217 as part of a registration request to the base station of the PLMN 216. The PLMN is coupled by way of line 264 to the PSTN 258 to permit the registration request to be transmitted thereto. As the PSTN 258 is coupled to the service node 248 by way of the line 262, the indications of the selected service subscription can be transferred from the PSTN to be stored at the service node 248.

When an originating party originates a call at the calling station 214, the originating party enters the unique identification of the service node 248. The calling station 214 is coupled to the PSTN 258 by way of a line 266. The PSTN 258 routes the call request to the service node 248 whereat the selected service subscription stored at the service node 248 is accessed, and the call is routed accordingly.

FIG. 7 illustrates the routing of signal transmission of the indications of the selected service subscription selected at the transceiver 212 of the communication system 200 by way of a cordless telephone network. The dual mode transceiver 212 transmits the indications of the selected service subscription as part of a registration request upon the radio frequency channel 219 and is received at the fixed port of the cordless telephone network 218. The registration request is transmitted upon the line 252 to the PBX 254 which, in turn, transmits the request upon the line 256 to the PSTN 258. The request is then transmitted upon the line 262 which is coupled to the service node 248 to store the indications of the selected service subscription thereat. A registration acknowledgment is returned, for example, by the service node to the transceiver 212 once the registration request is received and stored at the service node. The registration acknowledgment is returned by way of the same paths, in reverse order, as those paths taken by the registration request.

When an originating party located at the calling station 214 desires to place a call to be terminated at transceiver 212, the originating party enters the unique identification of the service node 248. The call request is routed by way of the line 266 to the PSTN 258, then by way of the line 262 to the service node 248.

If the selected service subscription stored at the service node 248 indicates that calls are to be routed to the transceiver 212 by way of the cordless telephone network, the call is routed from the service node on line 262 to the PSTN 258, then, by way of line 256 to the PBX 254, and, on line 252, to the fixed port of the cordless telephone network 218. The call is routed by way of the channel 219 to the transceiver 212.

Figure 8:
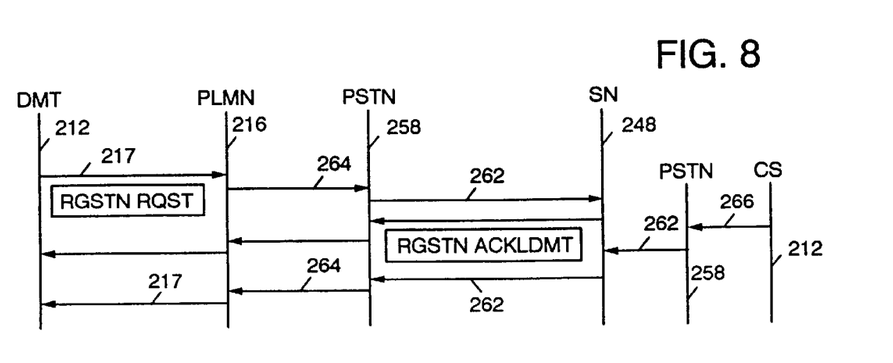
FIG. 8 is a graphical representation, similar to that shown in FIG. 7, but which illustrates another manner by which signals can be routed between the multi-mode transceiver and the calling station coupled to the communication system shown in FIG. 6.

FIG. 8 illustrates the routing of signal transmission by way of a PLMN to store the indications of the selected service subscription in the service node 248, and the routing of a call placed by an originating party at the calling station 214 to the transceiver 212 by way of the PLMN.

When communication by way of the PLMN is available, the indications of the selected service subscription can instead be transmitted by way of the radio channel 217 to a base station of the PLMN 216 as part of the registration request. Once received at the PLMN 216, signals representative of the indications are transmitted upon the line 264 to the PSTN 258, then, by the PSTN 258 upon the line 262 to the service node 248 to be stored thereat. A registration acknowledgment is returned to the transceiver.

When an originating party at the calling station 214 desires to place a call to the transceiver 212, the originating party enters the calling identification of the service node 248 and, a call request is routed by way of the line 266, the PSTN 258, and the line 262 to access the selected service subscription pursuant to which the call is to be routed to the transceiver 212.

If the call is to be routed to the transceiver 212 by way of the PLMN, the call is routed by way of the line 262 to the PSTN 258, then by way of the line 264 to the base station of the PLMN 216. The call is then routed by way of the radio channel 217 to be terminated at the transceiver 212.

Figure 9:
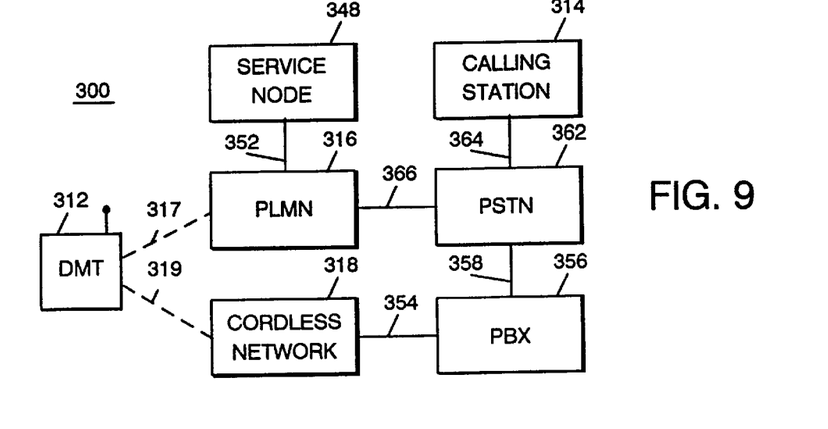
FIG. 9 is a functional block diagram, similar to those shown in FIGS. 3 and 6, but which illustrates a communication system of another configuration in which an embodiment of the present invention forms a portion.

FIG. 9 illustrates a communication system, shown generally at 300, of which an embodiment of the present invention forms a portion. A dual mode transceiver 312 is operable to terminate a call placed by an originating party at a calling station 314. The communication system 300 includes a public land mobile network (PLMN) 316 which includes the separately-illustrated transceiver 312 as a portion thereof, coupled to the PLMN by way of a radio channel 317. The communication system also includes a cordless telephone network 318 which includes the transceiver coupled thereto by way of a radio channel 319. A service node 348 is coupled to the PLMN 316 by way of line 352.

When communication pursuant to the cordless telephone system is available, indications of a service subscription selected at the transceiver 312 can be transmitted upon the radio channel 319 as part of a registration request to be received at a fixed port of the cordless telephone network 318. The network 318 is coupled by way of line 354 to a private branch exchange (PBX) 356. The PBX 356 is coupled by way of line 358 to a public service telephone network (PSTN) 362. The calling station 314 and the PLMN 316 are also coupled to the PSTN 362, by way of lines 364 and 366, respectively.

When communication pursuant to the cordless telephone network is available, indications of the selected service subscription are transmitted as part of a registration request by way of the radio frequency channel 319 to the fixed port of the network 318. The request is thereafter transmitted upon the line 354 to the PBX 356, then upon the line 358 to the PSTN 362, upon the line 366 to the PLMN 316, and then upon the line 352 to the service node 348 to store the indications thereat.

When communication by way of the PLMN 316 is available, indications of the selected service subscription can instead be transmitted upon the radio channel 317 as part of a registration request to a base station of the PLMN 316 and thereafter upon the line 352 to be stored at the service node 348.

When an originating party located at the calling station 314 desires to terminate a call at the transceiver 312, the unique identification address of the service node 348 is entered at the calling station. The selected service subscription is accessed at the service node 348, and the call is routed to the transceiver 312 pursuant to the selected service subscription.

Figure 10:
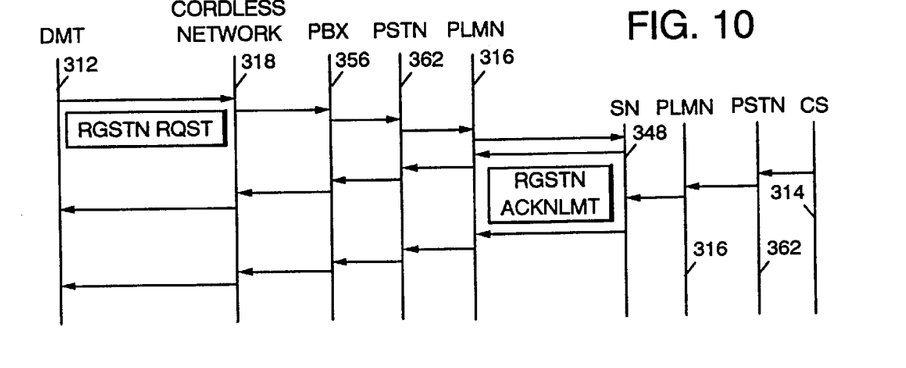
FIG. 10 is a graphical representation illustrating one manner by which signals can be routed between the multi-mode transceiver and the calling station of the communication system shown in FIG. 9.

FIG. 10 illustrates the paths of signal transmission and call routing during operation of the communication system 300 shown in FIG. 9. When communication by way of the cordless telephone network is available, indications of the selected service subscription can be transmitted by the transceiver 312 as part of a registration request upon the radio frequency channel 319 to the fixed port of the cordless telephone network 318. Thereafter, signals representative of such indications can be transmitted upon the line 354 as part of the registration request to the PBX 356, then upon the line 358 to the PSTN 362. The PSTN transfers the signals upon the line 366 to the PLMN 316 which supplies the signals representative of the indications of the selected service subscription to the service node 348 to be stored thereat. Once the registration request is received and stored at the service node, the service node returns a registration acknowledgment to the transceiver 312. The registration acknowledgment is returned, for example, by way of the same paths, in reverse order, as those paths taken by the registration request.

When an originating party desires to place a call to the transceiver 312, the digits uniquely identifying the service node 348 are entered at the calling station, and a call request is routed by way of the lines 364, PSTN 362, line 366, PLMN 316, and line 352 to access the selected service subscription stored at the service node 348.

If the selected service subscription provides for service pursuant to the cordless telephone network, the call is thereafter routed by way of the line 352 back to the PLMN 316, by way of the line 366 to the PSTN 362, by way of the line 358 to the PBX 356, by way of the line 354 to the fixed port of the cordless network 318, and by way of the channel 319 to be terminated at the transceiver 312.

Figure 11:
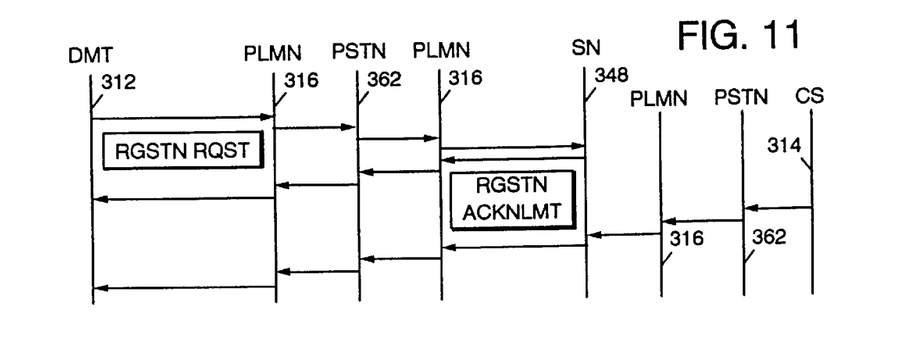
FIG. 11 is a graphical representation, similar to that shown in FIG. 10, but which illustrates another manner by which signals can be routed between the multi-mode transceiver and the calling station of the communication system shown in FIG. 9.

FIG. 11 illustrates signal transmission and call routing by way of a PLMN. If communication by way of the PLMN is available, the transceiver 312 can transmit the indications of the selected service subscription as part of a registration request by way of the channel 317 to the base station of the PLMN 316 and then, by way of the line 352, to be stored at the service node 348.

When an originating party at the calling station 314 desires to terminate a call at the transceiver 312, the unique identification code of the service node 348 is entered at the calling station 314. A call request is routed by way of the line 364 to the PSTN, then by way of the line 366 to the PLMN 316, and then by way of the line 352 to access the information stored at the service node 348. If the selected service subscription is for service by way of the PLMN, the call is routed by way of the line 352 to the base station of the PLMN 316, and by way of the radio channel 317 to the transceiver 312.

Figure 12:
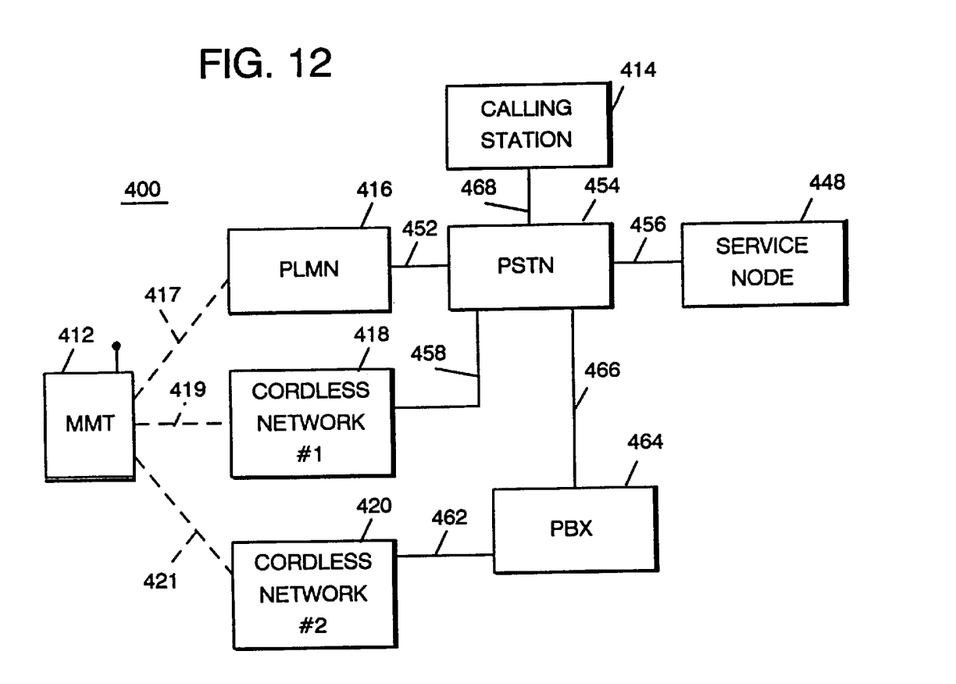
FIG. 12 is a functional block diagram, similar to those shown in FIGS. 3, 6, and 9, but which illustrates a communication system of another configuration in which an embodiment of the present invention forms a portion.

FIG. 12 illustrates a communication system, shown generally at 400, of which an embodiment of the present invention forms a portion. A multi-mode transceiver 412 is operative to terminate a call placed by an originating party at a calling station 414. The transceiver 412 is alternately operable as part of a public land mobile network (PLMN) 416 having a base station by which to communicate with the transceiver 412 by way of radio channel 417, a first cordless telephone network 418 having a first, fixed port by which to communicate with the transceiver 412 by way of radio channel 419, and a second cordless telephone network 420 having a second, fixed port by which to communicate by way of the radio channel 421.

A service subscription pursuant to which calls are to be routed to the transceiver 412 is selected at the transceiver 412, and the selected service subscription pursuant to which such calls are to be routed to the transceiver are stored at a service node 448.

The PLMN 416 is coupled by way of a line 452 to a public service telephone network (PSTN) 454 and, in turn, by way of a line 456 to the service node 448. When indications of the selected service subscription are transmitted as part of a registration request to the base station 416, signals representative of such indications are transferred, by way of the line 452 to the PSTN 454, and thereafter, by way of the line 456, to be stored at the service node 448.

The first network 418 is coupled by way of the line 458 to the PSTN 454. And, the second network 420 is coupled by way of the line 462 to the private branch exchange (PBX) 464, and the PBX 464 is coupled by way of the line 466 to the PSTN 454.

When the indications of the selected service subscription are transmitted as part of a registration request to the first cordless telephone network 418, signals representative of such indications are transmitted upon the line 458 to the PSTN 454, and, in turn, by way of the line 456 to the service node 448. Analogously, when the indications of the selected service subscription are transmitted to the second cordless network as part of a registration request, signals representative of such indications are transferred by way of the line 462 to the PBX 464, by way of the line 466 to the PSTN 454 and, by way of the line 456 to be stored at the service node 448.

When an originating party at the calling station 414 desires to terminate a call at the transceiver 412, the unique address of the service node 448 is entered at the calling station 414, and a call request is routed to access the stored information at the service node 448. The call is thereafter routed to the transceiver 412 pursuant to the service subscription stored at the service node.

Figure 13:
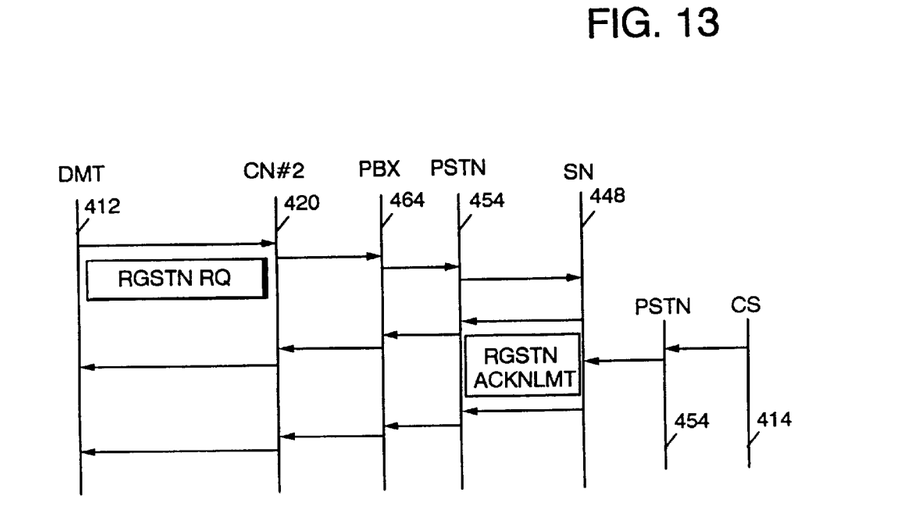
FIG. 13 is a graphical representation illustrating one manner by which signals can be routed between the multi-mode transceiver and the calling station of the communication system shown in FIG. 12.

FIG. 13 illustrates the signal paths of signals generated during operation of the communication system 400 shown in FIG. 12 when communication by way of the second cordless telephone network is available. Indications of the selected service subscription are transmitted by the transceiver 412 upon the radio frequency channel 421 to the second cordless telephone network. The registration request representative of such indications are thereafter transmitted upon the line 462 to the PBX 464, then upon the line 466 to the PSTN 454, and thereafter upon the line 456 to the service node 448 to be stored thereat. Once the registration request is received and stored at the service node, the service node sends a registration acknowledgment back to the transceiver by, for example, a route reverse to that taken by the registration request.

When an originating party desires to place a call to the transceiver 412, the unique identification of the service node 448 is entered, a call request is routed to the service node to access the selected service subscription stored therein. A call request is placed, by way of the line 468 to the PSTN 454 and the line 456 to the service node 448.

If the selected service subscription is for service by way of the second cordless telephone system, the call is thereafter routed by way of the line 456 to the PSTN 454, the line 466 to the PBX 464, by way of the line 462 to the port of the second cordless network 420 and upon the radio frequency channel 421 to terminate the call at the transceiver 412.

Figure 14:
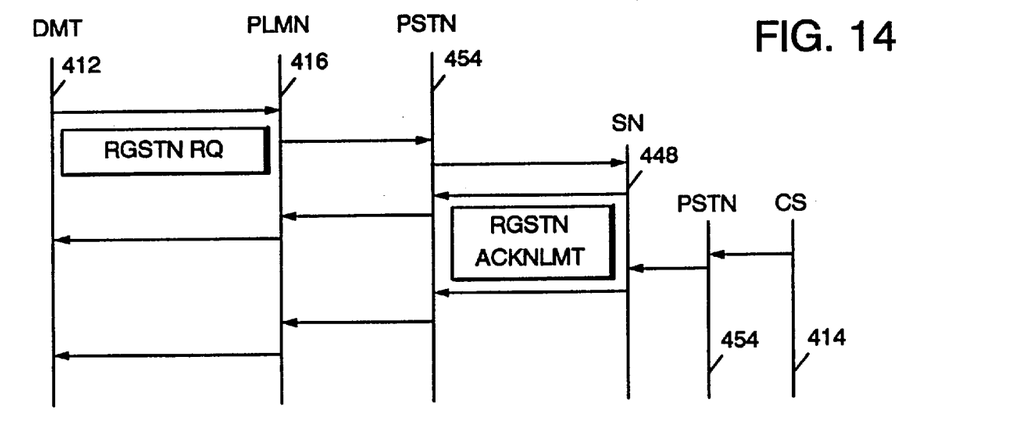
FIG. 14 is a graphical representation, similar to that shown in FIG. 13 but which illustrates another manner by which signals can be routed between the multi-mode transceiver and the calling station of the communication system shown in FIG. 12.

FIG. 14 illustrates operation of the communication system 400 when communication by way of the PLMN is available. Indications of the selected service subscription selected at the transceiver 412 are transmitted as part of a registration request upon the radio frequency channel 421 to the base station 416. Signals representative of such indications are transmitted upon the line 452 to the PSTN 454, then upon the line 456 to the service node 448. The selected service subscription is stored at the service node 448 thereby.

Once the registration request is received and stored at the service node, the service node sends a registration acknowledgment back to the transceiver by a route reverse to that taken by the registration request.

When an originating party at the calling station 414 desires to terminate a call at the transceiver 412, the unique address associated with the service node 448 is entered at the calling station. The call request is routed by way of the line 468 to the PSTN 454, and then by way of the line 456 to the service node 448.

If the selected service subscription provides for the call to be routed to the transceiver 412 by way of the PLMN, the call is routed by way of the line 456 to the PSTN 454, then by way of the line 452 to the PLMN 416. The call is routed by way of the channel 417 to the transceiver 412.

Figure 15:
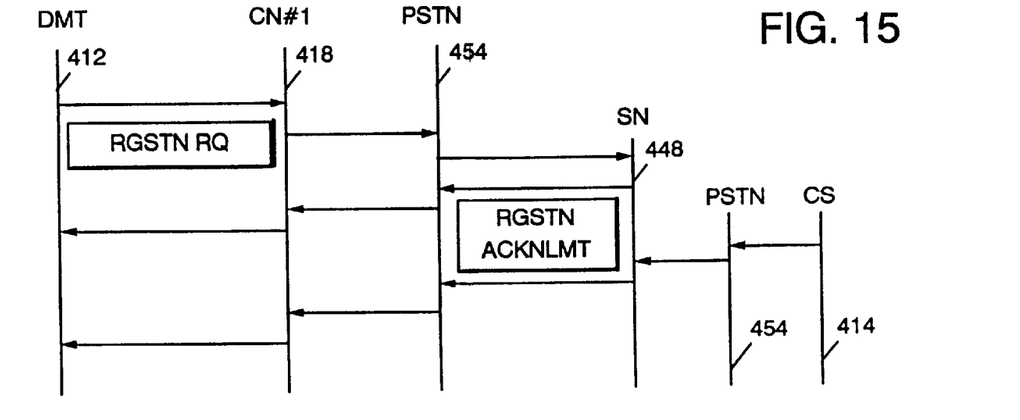
FIG. 15 is a graphical representation, similar to those shown in FIGS. 13-14, but which illustrates another manner by which signals can be routed between the multi-mode transceiver and the calling station of the communication system shown in FIG. 12.

FIG. 15 illustrates signal transmission of signals transmitted during operation of the communication system 400 when communication by way of the first cordless telephone network is available. Indications of the service subscription selected at the transceiver 412 are transmitted as part of a registration request by way of the radio frequency channel 419 to the fixed port of the network 418. Thereafter, the registration request is transmitted upon the line 458 to the PSTN 454 and, by way of the line 456, to the service node 448 to be stored thereat.

Once the registration request is received and stored at the service node, the service node sends a registration acknowledgment back to the transceiver by, for example, a route reverse to that taken by the registration request.

When an originating party at the calling station 414 desires to place a call to the transceiver 412, the unique address of the service node 448 is entered. A call request is routed by way of the line 468 to the PSTN and then by way of the line 456 to the service node 448.

When the service subscription stored at the service node 448 provides for the call to be routed by way of the first cordless network, the call is routed by way of the line 456 to the PSTN 454, and then by way of the line 458 to the fixed port of the cordless telephone network 418. The call is terminated by way of the channel 419 at the transceiver 412.

Figure 16:
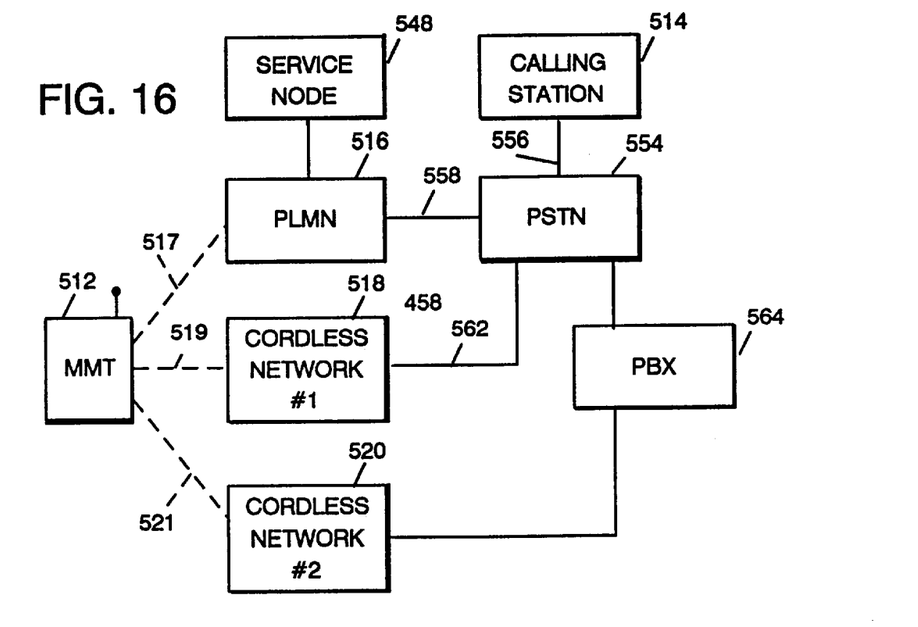
FIG. 16 is a functional block diagram, similar to those shown in FIGS. 3, 6, 9, and 12, but which illustrates a communication system of another configuration in which an embodiment of the present invention forms a portion.

FIG. 16 illustrates a communication system, shown generally at 500, of which an embodiment of the present invention forms a portion. Communication is permitted between a multi-mode transceiver 512 and a calling station 514. During operation of the communication system 500, a call placed by an originating party at the calling station 514 to be terminated at the transceiver 512 is routed to the transceiver pursuant to a service subscription selected at the transceiver 512.

The communication system 500 includes a public land mobile network (PLMN) 516 of which the separately-illustrated transceiver 512 forms a portion, coupled thereto by way of radio channel 517, a first cordless telephone network 518 of which the transceiver forms a portion, coupled thereto by radio channel 519, and a second cordless network 520 of which the transceiver forms a portion, coupled thereto by radio channel 521.

A service node 548 is coupled to the PLMN 516 by way of the line 552. a public service telephone network (PSTN) 554 is coupled to the calling station 514 by way of the line 556, the PLMN 516 is coupled to the PSTN 554 by way of the line 558, the network 518 is coupled to the PSTN 554 by way of the line 562, and the PSTN 554 is coupled to a private branch exchange (PBX) by way of the line 566. The PBX 564, in turn is coupled to the network 520.

In manners analogous to those described with respect to the communication systems 10, 100, 200, 300, and 400, indications of the selected service subscription selected at the transceiver 512 are stored in the service node 548. When a call is to be placed to the transceiver 512, the information stored at the service node 548 is accessed, and the call is routed to the transceiver 512 by way of the selected service subscription.

Figure 17:
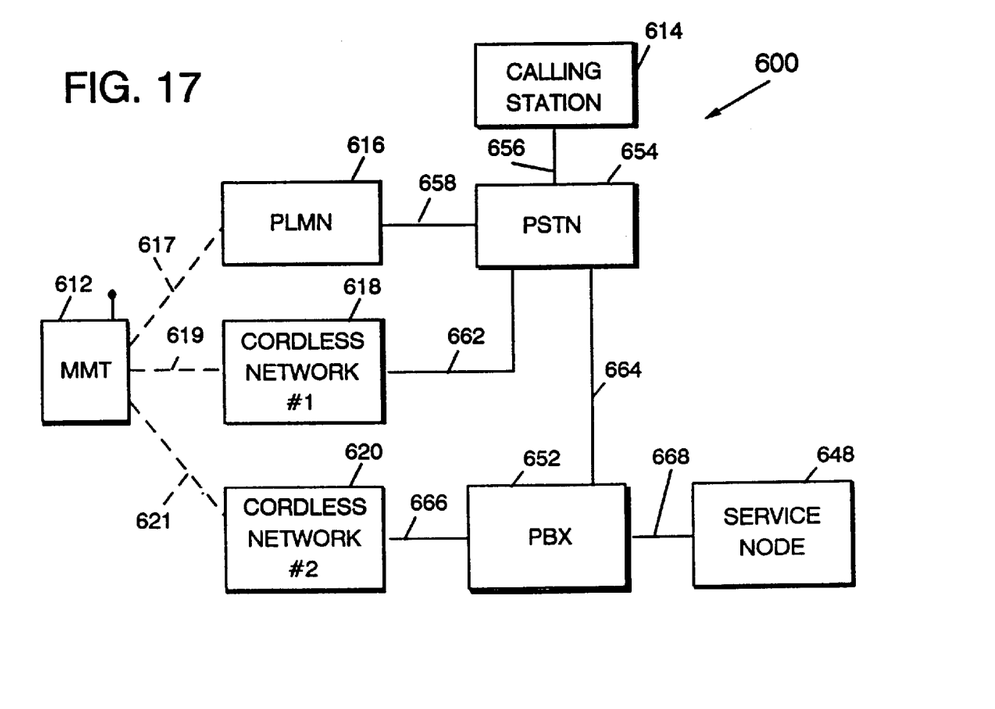
FIG. 17 is a functional block diagram, similar to those shown in FIGS. 3, 6, 9, 12, and 16, but which illustrates a communication system of another configuration in which an embodiment of the present invention forms a portion.

FIG. 17 illustrates a communication system, shown generally at 600, of which an embodiment of the present invention forms a portion. The communication system 600 includes a multi-mode transceiver 612 which permits communication with a calling station 614. When an originating party located at the calling station 614 places a call to be terminated at the transceiver, the call is routed to the transceiver 612 by way of a selected service subscription, selected at the transceiver. The communication system 600 includes a PLMN 616 which includes separately-illustrated transceiver 612 as a portion, coupled thereto by way of radio channel 617, a first cordless telephone network 618 of which the transceiver forms a portion, coupled thereto by way of channel 619, and second cordless telephone network 620 of which the transceiver forms a portion, coupled thereto by way of radio channel 621.

The selected service subscription pursuant to which calls are to be routed to the transceiver 612 is determined at the transceiver 612, and such indications are stored at a service node 648. In the communication system 600, the service node 648 is coupled to a private branch exchange (PBX) 652. A public service telephone network (PSTN) 654 is coupled to the calling station 614 by way of line 656, to the PLMN 616 by way of line 658, to the network 618 by way of line 662, and to the PBX 652 by way of the line 664. The network 620 is coupled to the PBX 652 by way of the line 666 and the service node 648 is coupled to the PBX 652 by way of the line 668.

A service subscription pursuant to which calls are to be routed to the transceiver 612 is selected at the transceiver and transmitted to either the PLMN 616, network 618, or network 620. Signals representative of such indications are transferred, in manners analogous to those described previously, to be stored at the service node 648. When an originating party located at the calling station 614 desires to place a call to the transceiver 612, the information stored at the service node 648 associated with the transceiver 612 is accessed. Responsive to such information, the call is routed to the transceiver 612 pursuant to the selected service subscription, all in manners analogous to those described previously.

The transceiver 612 is able to automatically select a service subscription pursuant to which calls are to be routed to the transceiver. Such selection is based upon the availability of service pursuant to a communication system and, if communication pursuant to more than one communication system is available, to select a preferred service subscription pursuant to which calls are to be routed to the transceiver. By storing information related to the selected service subscription at the service node 648, an originating party need only access the information stored at the service node, and the call placed by the originating is automatically routed to the transceiver pursuant to the selected service subscription. The originating party need only know the unique address of the service node and need not be familiar with each of the service subscriptions pursuant to which calls might be able to be routed to the transceiver.

The previous descriptions are of preferred examples for implementing the invention, and the scope of the invention should not necessarily be limited by this description. The scope of the present invention is defined by the following claims.

What is claimed is:

1. In a wireless communication system having a multi-mode transceiver operable pursuant to at least two separate service subscriptions to receive service in at least one wireless communication network, an improvement of a routing system for routing an incoming call directed to a multi-mode transceiver pursuant to a selected service subscription of the at least two separate service subscriptions, said routing system comprising:

a service selector positioned together with the multi-mode transceiver, said service selector for selecting the selected service subscription by which the incoming call directed to the multi-mode transceiver is to be routed;

a call router coupled to the at least one wireless communication network, said call router for receiving the incoming call and for routing the incoming call pursuant to the selected service subscription; and a selected-service transmitter coupled to said service selector to receive indications of the selected service subscription selected by said service selector, said selected-service transmitter for transmitting the indications of the selected service subscription to said call router.

2. The system of claim 1 wherein said service selector further comprises a service availability determiner for determining availability of service pursuant to the at least two separate service subscriptions and wherein selection of the selected service subscription is made responsive to the availability of service pursuant to the service subscriptions.

3. The system of claim 2 wherein said service availability determiner determines the availability of service pursuant to each of the at least two separate service subscriptions.

4. The system of claim 2 wherein said service availability determiner first determines the availability of service pursuant to a preferred service subscription and wherein the preferred service subscription is selected as the selected service subscription when the preferred service subscription is determined by said service availability determiner to be available.

5. The system of claim 3 wherein said service availability determiner determines the availability of the service at timed intervals, and wherein an other-than-preferred service subscription selected as the selected service subscription continues to be the selected service subscription for at least a minimum period of time after said service availability determiner determines the preferred service subscription to be available.

6. The system of claim 4 wherein the multi-mode transceiver comprises an input element actuatable by a user of the multi-mode transceiver and wherein the preferred service subscription is selected by the user by way of actuation of the input element.

7. The system of claim 2 wherein the at least two service subscriptions comprise a cellular network service subscription and a cordless telephone service subscription and wherein the preferred service subscription is the cordless telephone service subscription.

8. The system of claim 7 wherein the cordless telephone service subscription comprises a first cordless telephone service subscription and a second cordless telephone service subscription, and wherein the preferred service subscription is the first cordless telephone service subscription.

9. The system of claim 1 wherein said service selector automatically selects the selected service subscription.

10. The system of claim 1 wherein said call router comprises a service node identified by a unique address.

11. The system of claim 10 wherein said service node forms a portion of a public telecommunications network.

12. The system of claim 10 wherein said service node forms a portion of a private telecommunications network.

13. The system of claim 10 wherein said service node comprises a physical device.

14. The system of claim 10 wherein said service node comprises a logical device.

15. The system of claim 1 wherein the indications of the selected service subscription transmitted by said selected-service transmitter comprises an information element related to a calling number identification of a selected service subscription.

16. The system of claim 1 wherein the indications of the selected service subscription transmitted by said selected-service transmitter comprises dual tone multi-frequency signals formed of sequences of tones representative of the selected service subscription.

17. The system of claim 1 wherein the indications of the selected service subscription transmitted by said selected-service transmitter is transmitted upon a control channel upon which control data is transmitted between said selected-service transceiver and said call router.

18. The system of claim 1 wherein said call router is further operative to transmit an acknowledgment signal to the multi-mode transceiver acknowledging receipt of the indications transmitted by said selected-service transmitter.

19. The system of claim 1 wherein said call router comprises at least one distributed portion and a centrally-located database portion, said at least one distributed portion coupled to said centrally-located database portion.

20. The system of claim 1 wherein said call router comprises a centrally-located service node.

* * * * *